United States Patent [19]

Valfells

[11] 4,058,440
[45] Nov. 15, 1977

[54] CONCURRENT SEPARATION OF LITHIUM AND HYDROGEN ISOTOPES

[75] Inventor: August Valfells, Ames, Iowa

[73] Assignee: Iowa State University Research Foundation, Inc., Ames, Iowa

[21] Appl. No.: 623,361

[22] Filed: Oct. 17, 1975

[51] Int. Cl.$^2$ .................. C25B 1/14; C22B 26/12; C01B 1/07

[52] U.S. Cl. .................. 204/101; 423/180; 423/657; 204/125; 204/129

[58] Field of Search .......... 204/101, 99, 124, 125, 204/220, 248, 249, 129; 423/580, 657, 641, 180

[56] References Cited

U.S. PATENT DOCUMENTS

| | | | |
|---|---|---|---|
| 2,695,268 | 11/1954 | Wright | 204/101 |
| 2,873,237 | 2/1959 | Lamberton et al. | 204/125 |
| 3,104,949 | 9/1963 | Glover | 423/641 |
| 3,256,163 | 6/1966 | Winsel et al. | 204/101 |

FOREIGN PATENT DOCUMENTS

| | | | |
|---|---|---|---|
| 641,016 | 5/1962 | Canada | 204/125 |

Primary Examiner—Donald L. Walton
Attorney, Agent, or Firm—Zarley, McKee, Thomte & Voorhees

[57] ABSTRACT

A method of separating light hydrogen and deuterium which makes use of the differential reaction rates of alkali metal amalgams with water containing light hydrogen and water containing deuterium. Hydrogen is evolved and the remaining solution of the alkali metal hydroxide is enriched in deuterium. The foregoing described process is repeated in a plurality of stages in order to provide further enriched deuterium containing water. In addition, the process relates to a concurrent process for the separation of lithium-6 from lithium-7 and for the separation of deuterium from light hydrogen. In the concurrent process a lithium hydroxide solution is partially electrolyzed to provide a lithium amalgam enriched in lithium-6 and the lithium-6 enriched amalgam is reacted with water to provide a lithium hydroxide solution which is enriched in deuterium in the form of LiOD, HDO and to some extent $D_2O$.

13 Claims, 1 Drawing Figure

CONCURRENT SEPARATION OF LITHIUM AND HYDROGEN ISOTOPES

BACKGROUND OF THE INVENTION

Separation of isotopes of naturally occurring elements is an often difficult and time-consuming process. However, isotope separation is very useful in that the separated isotopes often have a variety of uses. For example, heavy hydrogen, or in other words, deuterium, is very valuable in isotope tracing studies wherein the heavy hydrogen can be traced through reactions in order to study the precise reaction mechanism. Also, heavy hydrogen is valuable as a moderator in nuclear reactors. It will also be one of the fuel constituents in fusion reactors. The abundance of deuterium in nature is about 1 part per 6,500 parts of hydrogen-1, hereinafter often referred to as light hydrogen.

Lithium exists in two isotope forms, lithium-6 and lithium-7. Lithium-6 comprises about 7% of natural lithium. Lithium-6 is valuable not only as a tracer isotope for lithium but also will certainly have value in fusion reactors as a precursor to tritium which is formed by the bombardment of lithium-6 with slow neutrons to provide helium and tritium.

As therefore can be seen, deuterium is a valuable isotope of hydrogen and correspondingly lithium-6 is a very valuable isotope of lithium. However, in nature the abundance ratios of both deuterium and lithium-6 are relatively small. Therefore, to be useful the deuterium and the lithium-6 must be concentrated and separated from the more abundant light hydrogen and lithium-7 isotopes.

Accordingly, one object of this invention is to provide a process which separates light hydrogen from heavy hydrogen.

Another object of this invention is to provide a process which separates lithium-6 from lithium-7.

Yet another object of this invention is to provide a process which separates light hydrogen from heavy hydrogen by performing a plurality of reactions of an alkali metal amalgam with water, taking advantage of the fact that in each reaction stage the reaction rate of light hydrogen containing water with the alkali metal amalgam is faster than the reaction rate of the heavy hydrogen containing water.

Yet another object of this invention is to provide a process which concurrently separates lithium-6 from lithium-7 and light hydrogen from heavy hydrogen.

A still further object of this invention is to provide a concurrent separation process for separating lithium-6 from lithium-7 and light hydrogen from heavy hydrogen which, because it is concurrent, may be substantially more economically feasible than independently run processes for separation of lithium isotopes and hydrogen isotopes.

Yet another object of this invention is to provide a separation process which concurrently separates lithium-6 from lithium-7 and light hydrogen from heavy hydrogen, lithium-6 being separated from the lithium-7 by partial electrolysis in a mercury cell, with the resulting lithium-6 enriched amalgam reacting with water to provide lithium hydroxide solution wherein the solution is lithium-6 enriched and deuterium enriched.

The method of accomplishing these and other objects of the invention will become apparent from the detailed description of the invention which follows.

BRIEF DESCRIPTION OF THE DRAWINGS

The single FIGURE is a flow chart showing the manner of accomplishing the concurrent separation of lithium-6 from lithium-b 7 and light hydrogen from heavy hydrogen. The flow chart also shows the flow rates for proper materials balance and the isotope concentrations for the flow rates provided in the feed stage, with the flow chart being for a single stage in the continuous process, represented as the "nth" stage.

DETAILED DESCRIPTION OF THE INVENTION

Figure 1:
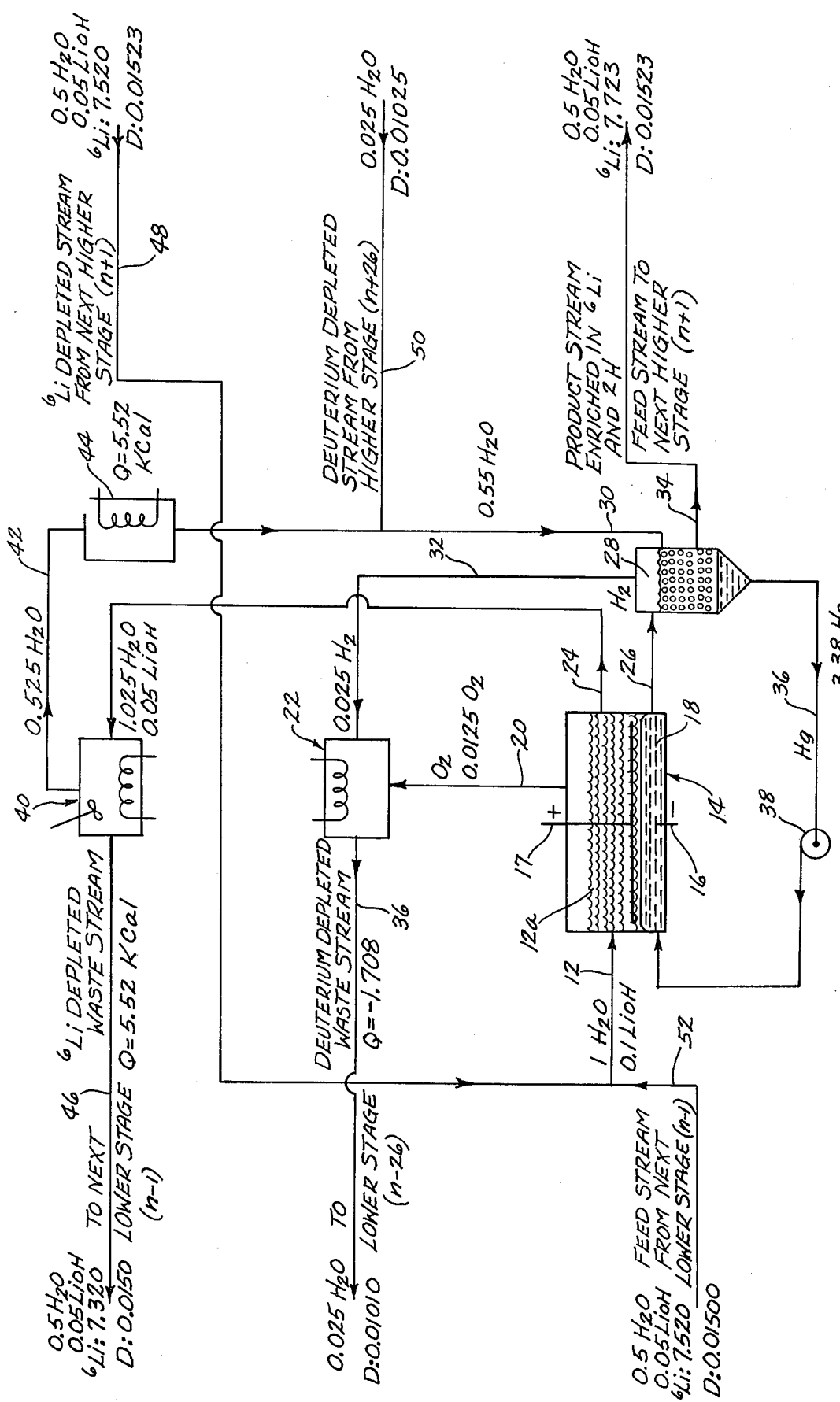

In order to more completely understand the detailed description of the invention which follows it will be necessary for purposes of clarity to provide definitions for certain terms utilized in describing the process.

The term "stage" as utilized herein refers to a single run through the process of the flow chart which will produce a partially separated product stream of lithium hydroxide which is enriched in both lithium-6 and deuterium.

The term "cascade" refers to a group of series-connected stages wherein the product from one stage is run through another stage in order to effectuate the desired degree of separation between product and waste materials.

The term "enriching section" refers to that portion of the cascade between the inlet or feed point and the product end stream. It is the portion of the cascade in which concentration of the desired isotope occurs.

The term "stripping section" refers to that portion of the cascade between the inlet or feed point and the waste end stream which is depleted of the desired lithium-6 and deuterium with respect to the natural concentrations of these isotopes. The stripping section increases over-all efficiency in that the waste stream is thereafter further separated by running through another stage with the product from the second run being used as a feed in an enriching section.

Occasionally the terms "heads stream" and "tails stream" will be utilized herein. It should be understood that "heads stream" refers to the enriched or product stream from a single stage and the "tails stream" refers to the product depleted stream from a single stage.

The term "enriched stream," or occasionally simply "enriched," refers to a stream which is concentrated with the desired isotope which is being separated.

The term "depleted stream" refers to a product stream from which a certain percentage of the desired isotope has been removed.

For further details with regard to the terminology utilized herein and basic explanatory information with regard to separating units, stages, and the operation of cascades, including the mathematics of the operation of an ideal cascade, see Benedict and Pigford, *Nuclear Chemical Engineering,* (McGraw-Hill Book Company, Inc., 1957) at chapter 10, pages 378 through 405, which are incorporated herein specifically by reference.

While as heretofore explained part of this concurrent process is based upon the principal that the two isotopes of hydrogen, i.e., light hydrogen and heavy hydrogen, can be separated by the differing reaction rates with alkali metal amalgams; and therefore, this process can be run independently of the lithium separation process, for purposes of convenience of description only, the process as described herein will be described as a concurrent process with continuing reference to the flow sheet shown in the drawing.

As is readily apparent to those skilled in the art, the precise flow rates into and through each stage and the entire cascade will depend upon the size of the individual units of apparatus utilized in making the cascade. However, as will be explained hereinafter, the necessary molar ratios for a proper materials balance are shown in connection with the drawing.

In addition, as is apparent to those skilled in the art, the number of stages utilized in the cascade depends upon the desired concentrations. Moreover, the number of stages in a cascade for isotope separation is typically quite large. For example, in uranium isotope separations it is common to have several hundred stages in a cascade. In the cascade shown in the example, described hereinafter, 315 stages are employed. Of course, the precise number of stages is not critical and depends entirely upon the desired concentrations of the isotope products one is seeking.

For purposes of description, it will be assumed that the drawing shows a single stage of a cascade in the concurrent process for the separation of lithium-6 and deuterium with the stage which is shown being the "nth " stage. It also will be assumed for purposes of description that start-up has occurred and that the entire cascade is running on a continuous basis.

The starting material for each stage is comprised of a lithium hydroxide solution. Preferably, the lithium hydroxide solution is a saturated solution of lithium hydroxide or alternatively a slurry of lithium hydroxide in a saturated lithium hydroxide solution; however, for ease of operation it is preferred that a saturated solution be employed.

The temperature of the lithium hydroxide solution is not critical, however, it is desirable to employ a saturated solution which contains as much lithium hydroxide in solution as possible. Typically, the lithium hydroxide solution may be fed into a stage in the process at a temperature within the range of from about 30° C. to about 80° C. and preferably at a temperature of from about 50° C. to about 70° C. However, it should be understood that the precise temperature employed is not critical.

The lithium hydroxide stream is fed through fed inlet line 12 into mercury electrolytic cell 14, hereinafter often referred to as a mercury cell. Mercury cell 14 is a conventional mercury cell which has a mercury cathode 16 and a graphite anode 17. The lithium hydroxide solution inside of the cell is depicted at 12a.

Mercury cells are well known in the electrolysis art and a variety of different types of mercury cells can be employed, for example, the mercury cell may be a Mathieson cell, a Solvay cell, a Uhde cell, a BASF-Krebs cell, a DeNora either horizontal or vertical cell, or the like. For further detailed description of mercury cells, the basic operation of which is well known and will therefore not be described herein, see Mantell, *Electrochemical Engineering*, (4th Edition) McGraw-Hill, at pages 257 through 277, which are incorporated herein specifically by reference.

Current is passed through mercury cell 14 at such a rate that for the residence time of any portion of the lithium hydroxide solution 12a in the cell 14 about one-half of the lithium hydroxide solution 12a is electrolized. Of course, the amount of current employed will depend upon the precise type and capacity of mercury cell which is employed. For example, mercury cells may be built in a small 1000 amp to very large 30 to 50 thousand or even as high as 150 thousand amp units. The critical factor in operation of the mercury cell 14 is not the amount of amperage employed but that at any given amperage the residence time of the lithium hydroxide solution 12a in the mercury cell is sufficient for some portion, and preferably about half, of the lithium hydroxide solution to undergo electrolysis. While it is not critical that the portion of the lithium hydroxide solution 12a which undergoes electrolysis be one-half of the lithium hydroxide solution, it is important that it be a portion less than the entire amount of lithium hydroxide solution and typically within the range of from about one-fourth of the lithium hydroxide solution 12a in the mercury cell 14 to about three-fourths of the volume of the lithium hydroxide solution in the mercury cell 14 and most preferably, about a one-half portion of the lithium hydroxide solution 12a in mercury cell 14.

The reaction which occurs upon electrolysis of the lithium hydroxide solution is the following:

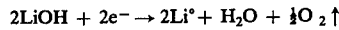

$$2\text{LiOH} + 2e^- \rightarrow 2\text{Li}^\circ + \text{H}_2\text{O} + \tfrac{1}{2}\text{O}_2 \uparrow$$

As can be seen, at the mercury cathode 16 the lithium ions accept an electron and become lithium metal forming an amalgam, represented at 18 in the drawing with the mercury. In addition, water is formed and oxygen is evolved. The evolved oxygen passes out of mercury cell 14 through outlet line 20 into fuel cell or burner 22 whose operation will be described hereinafter.

Lithium-6 and lithium-7 isotopes react at different rates in the amalgam forming electrolysis reaction of the lithium hydroxide solution in the mercury cell. It is this difference in reaction rates which is utilized in the process herein to separate the lithium-6 from the lithium-7. More particularly, the atoms of lithium-6, being lighter, are quicker to accept an election forming a lithium amalgam with the cathode 16 of the mercury cell. As a result the amalgam 18 is enriched in lithium-6 with respect to the amount of lithium-6 remaining in the nonelectrolized portion of the lithium hydroxide solution 12a which passes out of mercury cell 14 into a lithium-6 depleted mercury cell outlet line 24 which will be described in detail hereinafter.

The lithium amalgam 18 is removed from mercury cell 14 through amalgam outlet line 26 wherein it is fed into denuder 28, which will be described hereinafer in detail.

Thus, as can be seen when in continuous operation a saturated solution of lithium hydroxide is fed through inlet line 12 into mercury cell 14 wherein the lithium hydroxide is the electrolyte in the operation of the mercury cell. In the mercury cell oxygen is evolved and passes out of the mercury cell through outlet line 20 and partial electrolysis of the lithium hydroxide solution occurs with the formation of a lithium amalgam, with the amalgam being enriched in lithium-6 since lithium-6 is quicker to accept an electron and form the amalgam than lithium-7. Thus, the amalgam continuously bled out of mercury cell 14 through outlet line 26 is lithium-6 enriched. Correspondingly, the lithium hydroxide solution continuously flowing out of mercury cell 14 through outlet line 24, now less than saturated, is lithium-6 depleted.

The reason that the electrolysis in mercury cell 14 must be a partial electrolysis is that if the electrolysis for any given amount of the lithium hydroxide solution is allowed to go to completion, all of the lithium will be in the form of the amalgam and there will be no enriching occurring because of the differential reaction rate in forming the amalgam between lithium-6 which is faster, and lithium-7 which is correspondingly slower. For ideal operation about one-half of the lithium hydroxide should undergo electrolysis with generally satisfactory results obtained within the range of from about one-fourth to about three-fourths of the lithium hydroxide saturated solution undergoing electrolysis in the mercury cell 14.

Denuder 28, into which the lithium-6 enriched amalgam 18 is fed through line 26, is of conventional construction and comprises simply a vessel in which the amalgam and the water are reacted. Water is fed into denuder 28 through line 30 so that the reacting constituents in denuder 28 are lithium-6 enriched amalgam 18 fed in through line 26 continuously from mercury cell 14, and water 30. In the denuder the following reaction occurs:

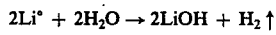

$$2Li^* + 2H_2O \rightarrow 2LiOH + H_2 \uparrow$$

As can be seen, the reaction system in the amalgam denuder 28 is a two-phase system comprising the water and the amalgam. In the reaction which occurs in the denuder 28 the lithium diffuses out to the surface of the amalgam and reacts with the water according to the above equation to provide lithium hydroxide and hydrogen. The evolved hydrogen passes out of denuder 28 through outlet line 32 to fuel cell or burner 22, which is hereinafter described.

It is the reaction within denuder 28, i.e., the reaction of the lithium-6 enriched amalgam with water to provide lithium hydroxide solution and hydrogen, which forms a basis of separation of the light and heavy hydrogen.

The deuterium containing water passing into denuder 28 through inlet line 30, typically in the form of HDO or in some instances $D_2O$, will react slower with the lithium-6 enriched amalgam than will the light hydrogen containing water, $H_2O$. As a result of this differential in reaction rates, the hydrogen which is evolved from the denuder through line 32 is heavy hydrogen depleted and the lithium hydroxide solution which remains in the denuder 28 is heavy hydrogen enriched in the form of HDO, LiOD and to some extent $D_2O$. The lithium hydroxide solution in the denuder is therefore enriched with respect to lithium-6 and enriched with respect to heavy hydrogen. It is continuously bled from the denuder through denuder lithium hydroxide solution outlet line 34. The mercury settles to the bottom of the denuder and is withdrawn by a line 36 and recycled by a pump 38 back into the mercury cell 14. The product withdrawn from the denuder 28 through line 34 is both enriched with lithium-6 and enriched with heavy hydrogen and contains a greater concentration of $^6Li$ and deuterium than the percentage of the isotopes of lithium-6 and deuterium contained in the inlet stream 12. The product enriched stream withdrawn through line 34, as hereinafter explained in more detail, can then become part of the feed for the next higher stage in the cascade. For example, in the drawing if the stage represented is the "nth" stage, the product withdrawn through line 34 becomes part of the feed stream 12 for the $n + 1$ stage wherein it is progressively concentrated to provide an even further enriched product stream having a greater concentration of lithium-6 and heavy hydrogen.

As is apparent from the foregoing, the basic reactions which allow for separation of the isotopes of lithium and the isotopes of hydrogen by employing the differential reaction rates of the isotopes in a given reaction have now been described. The separation of the lithium into a lithium-6 enriched head stream and a lithium-6 depleted tail stream occurs in the partial completeness electrolytic reaction in the mercury cell. The separation of hydrogen into a deuterium enriched head stream and a deuterium depleted tail stream occurs in the denuder 28.

Of course, if desired, the process of the separation of the light hydrogen and the deuterium can be employed separately without simultaneously performing a separation of lithium-6 and lithium-7. Where an independent process is employed for the separation of light hydrogen and deuterium, a single stage of the reaction unit would comprise a denuder wherein an alkali metal amalgam is reacted with water to provide an alkali metal hydroxide solution and evolved hydrogen. The evolved hydrogen would be deuterium depleted and the solution of the alkali metal hydroxide would be deuterium enriched, since the deuterium reacts slower with the alkali metals in the amalgam. Thereafter, the alkali metal hydroxide, or if desired the corresponding alkali metal, is separated from the solution to provide deuterium enriched water. The remaining deuterium enriched water is thereafter reacted again with additional amounts of alkali metal amalgam to provide further amounts of alkali metal hydroxide solution and hydrogen, with the alkali metal hydroxide solution being even further enriched in deuterium, and thereafter the alkali metal hydroxide or the corresponding alkali are again removed to provide water even further enriched in deuterium. Thus, as can be seen, the foregoing stages are sequentially repeated in a cascade to provide continually increasingly deuterium enriched water.

Again, as will be apparent to those skilled in the art, where the separation of light and heavy hydrogen is conducted independent of the lithium separation stage, it is not essential that the alkali metal employed be lithium and any alkali metal, for example, sodium can be employed with equally satisfactory results. However, as can be appreciated by those skilled in the art, and as heretofore previously explained, the process is substantially enhanced economically where the process is a dual element separation of both lithium-6 and deuterium wherein each stage comprises the concurrent separation process.

The relationship of the enriched streams and the depleted streams and the heads and tails of each portion of the stage shown in the drawing will now be discussed as well as the relationship of the depicted stage to other stages in the cascade.

As heretofore mentioned, oxygen is evolved through outlet line 20 from the mercury cell 14 by the reaction which occurs in the mercury cell 14. The oxygen, as depicted in the drawing, passes through outlet line 20 into fuel cell or burner 22. In addition, the hydrogen which is evolved from the reaction in the denuder 28 via line 32, and which is deuterium depleted, as heretofore explained, also passes into the burner or fuel cell 22. The hydrogen and oxygen in burner or fuel cell 22 can thereafter be utilized to recover the available energy therefrom via burning, or the like, with the resulting water which is formed as a by-product of the burner or fuel cell combustion, being a deuterium depleted waste stream. The waste stream passes out of fuel cell or burner 22 via line 36 as a tails stream which is then recycled to a stage lower in the cascade having substantially the same deuterium concentration as deuterium depleted waste stream 36. Mathematically, for a saturated lithium hydroxide solution at 30° C., as described herein, it can be shown that the stage having substantially the same deuterium concentration as the deuterium depleted stream represented by outlet line 36 is the stage represented by $n - 26$ wherein $n$ represents the stage being described herein.

As previously mentioned herein, the lithium hydroxide solution continuously bled from the mercury cell 14 through the mercury cell outlet line 24 is lithium-6 depleted since the lithium-6 reacts faster in the electrolysis reaction occuring in mercury cell 14 to provide the amalgam than does the lithium-7 isotope. The lithium hydroxide solution, depleted in lithium-6, passing out mercury cell 14 through outlet line 24 is, via line 24, in communication with a sequential evaporator and dissolver 40. Sequential evaporator and dissolver 40 is simply a conventional evaporatoring and dissolving apparatus wherein portions of the lithium hydroxide solution depleted in lithium-6 passing therein through line 24 are intermittently evaporated to dryness. The evaporated water in the form of vapor passes out of evaporator 40 via line 42, through condenser 44 wherein it is condensed and cooled to provide water again, typically at a temperature of about 30° C. but satisfactorily within the range of from 30° C. to 80° C. and preferably within the range of 50° C. to 70° C. The water passes out of condenser 44 and via line 30 to the denuder wherein it is employed in the light hydrogen and deuterium isotope separation step.

It is important to note that the sequential evaporator and dissolver is operated to intermittently evaporate to dryness certain portions of the lithium hydroxide solution which passes therein. The reason for this is to prevent premature separation via the differential distillation rate of the light hydrogen and the deuterium containing water which will occur with a partial evaporation of the entire portion of the lithium hydroxide solution since the light hydrogen containing water will evaporate at a faster rate than the heavy hydrogen containing water. Thus, the intermittent evaporation to dryness of portions of the incoming lithium hydroxide solution followed by no evaporation of other portions is accomplished in order to prevent a premature separation of the light and heavy hydrogen since the resulting concentrated lithium hydroxide solution which would remain in the evaporator 40 if only partial evaporation of the entire solution occurred would be heavy hydrogen enriched.

After the evaporation to dryness of certain portions of the lithium hydroxide solution entering into the sequential evaporator and dissolver 40 the lithium hydroxide residue remaining is dissolved in a subsequent incoming portion of the less than saturated lithium hydroxide solution entering evaporator and dissolver 40 from the mercury cell 14 via line 24. It is removed therefrom via line 46 to provide a lithium-6 depleted waste stream of a lithium hydroxide solution, now again saturated, which is fed as a part of the feed stream to the stage in the cascade represented by $n - 1$.

As depicted herein, the lithium-6 depleted tail stream from the next higher stage, $n + 1$, represented in the drawing as line 48, becomes part of the feed stream for the "$n$th" stage. Likewise, the deuterium depleted stream 50 from the stage in the cascade corresponding to $n + 26$, will, as can be shown mathematically, have substantially the same deuterium concentration as the deuterium depleted waste stream 36 of the "$n$th" stage and therefore is fed into line 30 wherein it becomes a portion of the water for the reaction which occurs in denuder 28. Likewise, the lithium enriched and deuterium enriched product stream at line 34 becomes part of the product stream feed for the next higher stage, $n + 1$.

Thus as can be seen the cascade depicted herein is a countercurrent recycle cascade with the feed for each stage consisting of the heads from the next lower stage and the tails from the next higher stage with respect to the lithium. Moreover, wherein the depleted streams are recycled within the cascade, they are preferably always recycled to a point wherein the product stream into which they are recycled has substantially the same concentration as the stream being recycled. As it is apparent to those skilled in the art, streams which are recycled are always desirably fed into a cascade at the same concentration as another feed stream since the mixing of concentrations always increases entropy.

As heretofore mentioned previously it is preferred in the sequential evaporator and dissolver 40 that evaporation to dryness occur for about one-half of the lithium hydroxide which passes therethrough. Typically, the residence time, which obviously can vary over a considerable wide range in the evaporator and dissolver 40, will be within the range of from about 5 minutes to about ½ hour with from about ten minutes to about twenty minutes being most practical. Of course, the exact residence time therein is dictated by the size and capacity of evaporator 40.

As heretofore previously mentioned, the number of stages in the cascade will vary depending upon the desired concentration of lithium-6 and deuterium. Typically, the number of stages in a cascade is large. For example, it is not uncommon to have as many as three hundred stages in a cascade. Mathematically, for example, it can be shown that for achievement of a lithium-6 concentration or mole fraction of 0.997, when employing a saturated solution of lithium hydroxide at 30° C., 315 stages should be employed in the cascade.

The materials balance of any given stage will depend upon where in the cascade that particular stage is placed as well as upon the operating temperature as will both solubility of the lithium hydroxide in water and the separation factors for both the lithium-6 isotope and the deuterium isotope. The figures presented on the drawing for each feed and outlet line show a water concentration and a lithium hydroxide concentration and the material balance for a stage near the feed stage, in a cascade, when a saturated solution of lithium hydroxide at 30° C. is fed into mercury cell 14 and in which one-half of the lithium hydroxide is electrolized so that half of the lithium is transferred to the amalgam 18 by the electrolysis. With respect to lithium this would give a cut, i.e., a ratio of heads to the feed of 0.5 and thus correspond to an ideal cascade situation. Of course, the same would not be true with respect to the deuterium as the cut is much greater, 0.909 in this case.

The energy recovered from the burner or fuel cell 22, the energy requirements for the evaporator dissolver 40, and the energy extracted from the condenser 44, are also indicated for one gram mole of water feed. Of course, the materials balance presented herein is for illustrative purposes only in order to provide specific guidelines for materials balance in running each stage of the cascade. As is apparent to those skilled in the art, the precise ratios employed in the material balance will vary depending on the specific conditions utilized.

The numbers appearing just below the molar concentrations of water and lithium hydroxide on the drawing and appearing with the symbol for lithium-6 or alternatively for deuterium, provide the isotope concentrations for the flows indicated in FIG. 1, in terms of atom percent of the desired isotope for the product line nearest the numbers. The example illustrated pertains to the cascade feed stage. For example, the atom percentage concentration of lithium-6 in the lithium hydroxide stream of line 34, for the conditions specified in the drawing, will be 7.723% and the deuterium concentration 0.01523%.

While the necessary information for one specific stage has already been provided in the drawing, the following example for the entire cascade is also offered to further illustrate but not limit the process of this invention.

EXAMPLE

In the following example the process will be run as a dual element isotope separation cascade for concurrently separating lithium-6 and deuterium from their more abundant counterparts. The starting material for the first stage of the cascade is a saturated solution of lithium hydroxide at 30° C. The number of stages in the cascade is 315 with 310 of the stages being enriching stages and five of the stages being stripping stages. Each stage corresponds to the flow chart shown in the drawing. The overall flow rate through the process is 100 kilogram moles of lithium feed per day. The mole fraction of lithium-6 obtained from the 315th stage through line 34 is 0.997; correspondingly, the mole fraction of deuterium obtained is 0.015. These mole fractions correspond to a percentage of lithium-6 of 99.7% and a percentage of deuterium of 1.5%. The process will be described after start-up and after the process is being run on a continuous basis.

The feed through line 12 into mercury cell 14 with respect to the feed stage is 100 kilogram moles of lithium hydroxide and 1000 kilogram moles of water. The mole fraction of lithium-6 in the feed material for the first stage is 0.075 and the mole fraction for deuterium in the feed water is 0.00015. The mercury cell 14 is a DeNora horizontal cell operating at 75% current efficiency with a current of 150,000 amps and a potential of approximately 5 volts. One-half of the lithium in solution 12a in mercury cell 14 is electrolyzed out of the solution to provide lithium amalgam 18 and oxygen which passes through outlet 20. The oxygen is continually fed to fuel cell or burner 22. The lithium amalgam, which is enriched in lithium-6 is continuously bled from electrolysis cell 14 through line 26 to denuder 28. In denuder 28 the lithium-6 enriched amalgam reacts with water provided through line 30 to provide lithium hydroxide enriched in both lithium-6 and deuterium, and hydrogen. The hydrogen passes from denuder 28 through line 32 into fuel cell 22 wherein it is burned with the oxygen escaping from mercury cell 14 to provide, as a combustion product, a deuterium depleted water stream 36 which is recycled as part of the feed stream to a stage in th cascade coresponding to n - 26, provided then "n" is larger than 26, otherwise it is discarded.

The mercury provided in denuder 28 settles to the bottom and is recirculated via line 36 and pump 38 back into mercury cell 14.

The nonelectrolized portion of the lithium hydroxide solution from mercury cell 14 passes via line 24 to evaporator and dissolver 40. The lithium hydroxide solution passing into evaporator and dissolver 40 via line 24 is lithium-6 depleted. In evaporator and dissolver 40 a first portion of lithium hydroxide solution is evaporated to dryness and escapes as water vapor via line 42, is cooled and condensed in condenser 44 and fed via line 30 into the denuder 28 wherein the water is reacted with the lithium amalgam. In addition, water is fed via line 50 from the deuterium depleted stream from stage n + 26 into line 30.

After evaporation to dryness in evaporator 40 of a first portion of the lithium-6 depleted lithium hydroxide solution passing into separator and dissolver 40 via line 24, the residue is dissolved in a second portion of the incoming lithium hydroxide solution, equal in volume to the first evaporated portion and thereafter passes out of evaporator 40 via line 46 as lithium-6 depleted saturated lithium hydroxide waste stream which becomes a part of the feed stream for the next lower stage, i.e., n - 1. In actual operation, for any given stage, other than the first, the feed stream for the mercury cell is comprised in part of the lithium-6 depleted tail stream 48 from the next higher stage, n + 1, and the product stream or head stream from the next lower stage, n - 1, 52.

The amount of hydrogen generated per day in the feed stage at the flow rate specified herein is 50 moles of hydrogen per day passing from the denuder via line 32 into fuel cell or burner 22 and correspondingly the amount of oxygen passing into fuel cell or burner 22 per day from the mercury cell 14 is 25 moles of oxygen.

As is well known, the data presented pertaining to the feed stage of a cascade can be extended to encompass the entire cascade by employing the concepts of separative duty and separation potential, the details of which are provided in the previously incorporated by reference portion of Benedict and Pigford. Basically, separative duty refers to the multiplication factor employed with data from a single stage to arrive at data for an entire cascade. Separation potential refers to the magnitude of isotope separation effort required to separate isotopes of any given element. It is a function of the abundance ratio of the isotope.

The cascade described herein produces 0.9 kilogram moles of enriched lithium hydroxide/day, and 9 kilogram moles of enriched $H_2O$/day, with the degree of enrichment corresponding to the previously presented mole fractions.

The waste stream from the stripping section comprises 99.1 kilogram moles of lithium hydroxide and 991 kilogram moles of water. The mole fraction of lithium-6 in the waste stream is 0.06663 and the mole fraction of deuterium is $1.5 \times 10^{-5}$.

The separative duty for the stage described herein is 20.43 with regard to the lithium and the flow rate through the entire cascade is 54,020 kilogram moles of solution per kilogram mole of lithium-6 enriched product.

With regard to the separation of heavy hydrogen by reaction of lithium amalgam with water, when this process is run independently of the lithium separation portion, heavy hydrogen enrichment is accomplished. Moreover, substantially similar results are obained when the amalgam is a sodium amalgam or a potassium amalgam in that separation of heavy hydrogen enriched product is accomplished.

What is claimed is:

1. A method of separating light hydrogen and deuterium, said method comprising,
   reacting an alkali metal amalgam with water to provide an alkali metal hydroxide solution and hydrogen,
   removing the evolved hydrogen, said solution of alkali metal hydroxide being enriched in deuterium, and
   separating the alkali metal hydroxide or the corresponding alkali metal from said solution to provide deuterium enriched water, and thereafter, reacting repeatedly in the same manner the deuterium enriched water with alkali metal amalgam to provide a continually increasing enrichment of deuterium.

2. The method of claim 1 wherein the alkali metal is sodium.

3. The method of claim 1 wherein the alkali metal is lithium.

4. The method of claim 3 wherein said method of separating light hydrogen and deuterium is part of a single stage of a concurrent lithium and hydrogen isotope separation cascade.

5. The method of claim 4 wherein said concurrent lithium and hydrogen isotope separation cascade is a countercurrent recycle cascade.

6. A method of concurrently separating lithium-6 from lithium-7 and light hydrogen from deuterium, said method comprising,
   partially electrolyzing a lithium hydroxide solution in a mercury cell to provide evolved oxygen, lithium amalgam and remaining lithium hydroxide solution, said lithium amalgam being enriched in lithium-6,
   reacting said lithium metal amalgam with water to provide lithium hydroxide solution and hydrogen,
   removing the evolved hydrogen, said solution of lithium hydroxide being enriched in both deuterium and lithium-6 and
   repeating said method in a plurality of stages which in composite form a cascade, said method being performed once in each stage, to provide continually increasing enrichment of said lithium hydroxide solution with respect to both deuterium and lithium-6.

7. The method of claim 6 wherein said enriched solution is again subjected to the foregoing partial electrolysis and with part of the remaining lithium hydroxide solution being evaporated to dryness, with the vapor therefrom being condensed and reacted with said amalgam formed by said partial electrolysis to provide a lithium hydroxide solution even further enriched in lithium-6 and deuterium.

8. The method of claim 7 wherein said lithium hydroxide solution is a saturated solution.

9. The method of claim 6 wherein the product enriched stream of lithium hydroxide which is enriched in both deuterium and lithium-6 from one stage forms at least a part of a feed stream of the lithium hydroxide solution for partial electrolyzing in a next stage of said cascade.

10. The method of claim 6 wherein lithium-6 and deuterium depleted waste streams of one stage of said cascade are fed into the process of lower stages of said cascade having substantially similar concentrations.

11. A method of concurrently separating lithium-6 from lithium-7 and light hydrogen from deuterium, said method comprising,
    partially electrolyzing a saturated lithium hydroxide solution in a mercury cell to provide evolved oxygen, lithium amalgam and remaining lithium hydroxide solution, said lithium amalgam being enriched in lithium-6 and correspondingly said remaining lithium hydroxide solution being depleted in lithium-6 with respect to said amalgam,
    removing said remaining lithium hydroxide solution from said mercury cell,
    evaporating to dryness a part of said remaining lithium hydroxide solution to provide a residue of lithium-6 depleted lithium hydroxide and water vapor,
    condensing said water vapor,
    reacting said water vapor with said lithium amalgam to provide evolved hydrogen, mercury and a lithium hydroxide solution, said lithium hydroxide solution being enriched with respect to both lithium-6 and deuterium.

12. The method of claim 11 wherein said mercury is recycled to said mercury cell.

13. The method of claim 10 wherein said process is repeated in a plurality of stages which in composite form a cascade.

* * * * *